US010887325B1

(12) United States Patent
Lin et al.

(10) Patent No.: US 10,887,325 B1
(45) Date of Patent: Jan. 5, 2021

(54) BEHAVIOR ANALYTICS SYSTEM FOR DETERMINING THE CYBERSECURITY RISK ASSOCIATED WITH FIRST-TIME, USER-TO-ENTITY ACCESS ALERTS

(71) Applicant: Exabeam, Inc., San Mateo, CA (US)

(72) Inventors: Derek Lin, San Mateo, CA (US); Baoming Tang, San Mateo, CA (US); Qiaona Hu, Emerald Hills, CA (US); Barry Steiman, San Ramon, CA (US); Domingo Mihovilovic, Menlo Park, CA (US); Sylvain Gil, San Francisco, CA (US)

(73) Assignee: Exabeam, Inc., Foster City, CA (US)

( * ) Notice: Subject to any disclaimer, the term of this patent is extended or adjusted under 35 U.S.C. 154(b) by 235 days.

(21) Appl. No.: 15/894,703

(22) Filed: Feb. 12, 2018

Related U.S. Application Data (60) Provisional application No. 62/458,496, filed on Feb. 13, 2017.

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/20* (2013.01)

(58) Field of Classification Search
CPC ...... H04L 63/1416; H04L 63/20; G06N 20/00
See application file for complete search history.

(56) References Cited

U.S. PATENT DOCUMENTS

| | | | |
|---|---|---|---|
| 5,941,947 | A | 8/1999 | Brown et al. |
| 6,223,985 | B1 | 5/2001 | DeLude |
| 6,594,481 | B1 | 7/2003 | Johnson et al. |
| 7,668,776 | B1 | 2/2010 | Ahles |
| 8,326,788 | B2 | 12/2012 | Allen et al. |
| 8,443,443 | B2 | 5/2013 | Nordstrom et al. |
| 8,479,302 | B1 | 7/2013 | Lin |

(Continued)

OTHER PUBLICATIONS

Cooley et al., "Web mining: information and pattern discovery on the World Wide Web", Proceedings Ninth IEEE International Conference on Tools with Artificial Intelligence, Date of Conference: Nov. 3-8, 1997.*

(Continued)

*Primary Examiner* — Morshed Mehedi
(74) *Attorney, Agent, or Firm* — Lessani Law Group, PC (57) ABSTRACT

The present disclosure describes a system, method, and computer program for determining the cybersecurity risk associated with a first-time access event in a computer network. In response to receiving an alert that a user has accessed a network entity for the first time, a user behavior analytics system uses a factorization machine to determine the affinity between the accessing user and the accessed entity. The affinity measure is based on the accessing user's historical access patterns in the network, as wells as context data for both the accessing user and the accessed entity. The affinity score for an access event may be used to filter first-time access alerts or weight first-time access alerts in performing a risk assessment of the accessing user's network activity. The result is that many false-positive first-time access alerts are suppressed and not factored (or not factored heavily) into cybersecurity risk assessments.

20 Claims, 4 Drawing Sheets

(56) References Cited

U.S. PATENT DOCUMENTS

| | | | |
|---|---|---|---|
| 8,539,088 B2 | 9/2013 | Zheng | |
| 8,583,781 B2 * | 11/2013 | Raleigh | H04L 63/08 709/224 |
| 8,606,913 B2 | 12/2013 | Lin | |
| 8,676,273 B1 | 3/2014 | Fujisaki | |
| 8,881,289 B2 | 11/2014 | Basavapatna et al. | |
| 9,055,093 B2 | 6/2015 | Borders | |
| 9,081,958 B2 | 7/2015 | Ramzan et al. | |
| 9,189,623 B1 | 11/2015 | Lin et al. | |
| 9,680,938 B1 | 6/2017 | Gil et al. | |
| 9,692,765 B2 | 6/2017 | Choi et al. | |
| 9,760,240 B2 | 9/2017 | Maheshwari et al. | |
| 9,779,253 B2 | 10/2017 | Mahaffey et al. | |
| 9,798,883 B1 * | 10/2017 | Gil | G06F 21/577 |
| 9,843,596 B1 | 12/2017 | Averbuch et al. | |
| 9,898,604 B2 | 2/2018 | Fang et al. | |
| 10,095,871 B2 | 10/2018 | Gil et al. | |
| 10,178,108 B1 | 1/2019 | Lin et al. | |
| 10,419,470 B1 | 9/2019 | Segev et al. | |
| 10,467,631 B2 | 11/2019 | Dhurandhar et al. | |
| 10,474,828 B2 | 11/2019 | Gil et al. | |
| 10,496,815 B1 * | 12/2019 | Steiman | G06N 20/00 |
| 2002/0107926 A1 | 8/2002 | Lee | |
| 2003/0147512 A1 | 8/2003 | Abburi | |
| 2004/0073569 A1 | 4/2004 | Knott et al. | |
| 2006/0090198 A1 | 4/2006 | Aaron | |
| 2007/0156771 A1 | 7/2007 | Hurley et al. | |
| 2007/0282778 A1 | 12/2007 | Chan et al. | |
| 2008/0040802 A1 | 2/2008 | Pierson et al. | |
| 2008/0170690 A1 | 7/2008 | Tysowski | |
| 2008/0301780 A1 | 12/2008 | Ellison et al. | |
| 2009/0144095 A1 | 6/2009 | Shahi et al. | |
| 2009/0171752 A1 * | 7/2009 | Galvin | G06Q 10/063 705/7.11 |
| 2009/0293121 A1 | 11/2009 | Bigus et al. | |
| 2010/0125911 A1 * | 5/2010 | Bhaskaran | G06Q 10/10 726/23 |
| 2010/0269175 A1 | 10/2010 | Stolfo et al. | |
| 2012/0278021 A1 | 11/2012 | Lin et al. | |
| 2012/0316835 A1 | 12/2012 | Maeda et al. | |
| 2012/0316981 A1 | 12/2012 | Hoover et al. | |
| 2013/0080631 A1 | 3/2013 | Lin | |
| 2013/0117554 A1 | 5/2013 | Ylonen | |
| 2013/0197998 A1 * | 8/2013 | Buhrmann | G06Q 30/0255 705/14.53 |
| 2013/0227643 A1 | 8/2013 | Mccoog | |
| 2013/0305357 A1 | 11/2013 | Ayyagari et al. | |
| 2013/0340028 A1 | 12/2013 | Rajagopal et al. | |
| 2014/0315519 A1 | 10/2014 | Nielsen | |
| 2015/0046969 A1 | 2/2015 | Abuelsaad et al. | |
| 2015/0121503 A1 | 4/2015 | Xiong | |
| 2015/0205944 A1 * | 7/2015 | Turgeman | G06F 21/316 726/7 |
| 2015/0339477 A1 * | 11/2015 | Abrams | G06F 21/554 726/23 |
| 2015/0341379 A1 | 11/2015 | Lefebvre et al. | |
| 2016/0005044 A1 * | 1/2016 | Moss | G06Q 20/4016 705/44 |
| 2016/0021117 A1 | 1/2016 | Harmon et al. | |
| 2016/0306965 A1 | 10/2016 | Iyer et al. | |
| 2016/0364427 A1 * | 12/2016 | Wedgeworth, III | G06F 16/215 |
| 2017/0019506 A1 * | 1/2017 | Lee | H04L 67/02 |
| 2017/0024135 A1 * | 1/2017 | Christodorescu | G06F 3/0604 |
| 2017/0155652 A1 * | 6/2017 | Most | H04L 43/0876 |
| 2017/0161451 A1 | 6/2017 | Weinstein et al. | |
| 2017/0213025 A1 | 7/2017 | Srivastav et al. | |
| 2017/0236081 A1 | 8/2017 | Grady Smith et al. | |
| 2017/0318034 A1 | 11/2017 | Holland et al. | |
| 2018/0004961 A1 | 1/2018 | Gil et al. | |
| 2018/0048530 A1 | 2/2018 | Nikitaki et al. | |
| 2018/0069893 A1 * | 3/2018 | Amit | H04L 63/1416 |
| 2018/0144139 A1 * | 5/2018 | Cheng | G06F 21/577 |
| 2018/0165554 A1 | 6/2018 | Zhang et al. | |
| 2019/0034641 A1 | 1/2019 | Gil et al. | |
| 2019/0334784 A1 | 10/2019 | Kvernvik et al. | |
| 2020/0021607 A1 | 1/2020 | Muddu et al. | |
| 2020/0082098 A1 | 3/2020 | Gil et al. | |

OTHER PUBLICATIONS

Ioannidis, Yannis, "The History of Histograms (abridged)", Proceedings of the 29th VLDB Conference (2003), pp. 1-12.

Chen, Jinghui, et al., "Outlier Detection with Autoencoder Ensembles", Proceedings of the 2017 SIAM International Conference on Data Mining, pp. 90-98.

DatumBox Blog, "Machine Learning Tutorial: The Naïve Bayes Text Classifier", DatumBox Machine Learning Blog and Software Development News, Jan. 2014, pp. 1-11.

Freeman, David, et al., "Who are you? A Statistical Approach to Measuring User Authenticity", NDSS, Feb. 2016, pp. 1-15.

Malik, Hassan, et al., "Automatic Training Data Cleaning for Text Classification", 11th IEEE International Conference on Data Mining Workshops, 2011, pp. 442-449.

Wang, Alex Hai, "Don't Follow Me Spam Detection in Twitter", International Conference on Security and Cryptography, 2010, pp. 1-10.

* cited by examiner

BEHAVIOR ANALYTICS SYSTEM FOR DETERMINING THE CYBERSECURITY RISK ASSOCIATED WITH FIRST-TIME, USER-TO-ENTITY ACCESS ALERTS

RELATED APPLICATIONS

This application claims the benefit of U.S. Provisional Application No. 62/458,496 filed on Feb. 13, 2017, and titled "Computing User-to-Entity Affinity for User and Entity Behavior Analytics Applications," the contents of which are incorporated by reference herein as if fully disclosed herein.

BACKGROUND OF THE INVENTION

1. Field of the Invention

This invention relates generally to user behavior analytics systems that detect cyber threats and more specifically to determining the risk associated with a user's first-time access of an entity in a computer network.

2. Description of the Background Art

From theft of corporate account information to targeted campaigns against governments, major network and data breaches have become larger in scale and more serious in recent years. The need to identify network security threats has never been greater. Traditionally enterprises rely on matching data against known blacklist signatures or take approaches based on hand-written rules. Such methods do not have enough coverage and are ineffective against signature-less attacks from either an ill-intentioned insider whose traffic is legitimate or an external adversary who conducts lateral movement activity.

User Behavior Analytics (UBA) has emerged in the cybersecurity industry as a viable approach to detect anomalies of user behaviors by machine learning and statistical analysis. Commercial security monitoring systems for UBA maintain a database of individual behavior profiles for users and groups. Statistical indicators are designed to detect anomalies against the profiles for alerting. Scores from triggered indicators in a user session are then fused for a final score for prioritization. An example of a UBA cybersecurity monitoring system is described in U.S. Pat. No. 9,798,883 issued on Oct. 24, 2017 and titled "System, Method, and Computer Program for Detecting and Assessing Security Risks in a Network," the contents of which are incorporated by reference herein.

A critically important criterion for a successful commercial UBA system is the ability to explain its alerts. For this reason, state-of-the-art commercial UBA systems widely use a class of detection indicators on whether a user accessed a network entity for the first time against the built user profile; for example, whether a user accesses an entity such as a server, a network zone, a cloud application, or an endpoint process for the first time with respect to her history. Similarly, corporate insider threat detection systems employ numerous features focusing on user or entity access behaviors that are new or for the first time. Alerts from these indicators correlate well with malicious insider or compromised account activities like lateral movement. However, since user behavior is highly dynamic on the network, some legitimate user activities will trigger such alerts which are therefore false positives. Therefore, there is demand for a cyber security monitoring system that is able to ascertain the risk associated with a first-time access event and reduce false positive alerts without compromising cyber security.

SUMMARY OF THE DISCLOSURE

The present disclosure describes a system, method, and computer program for determining the risk associated with a first-time, user-to-entity access event in a computer network. A "first-time, user-to-entity access event" or a "first-time access event" is the first time a user is observed to access an entity, such as a server, network zone, cloud application, or endpoint process, in a computer network. The method is performed by a computer system, such as a UBA system or a user-and-entity analytics system (UEBA system) that detects cyber threats in a network and performs risk assessments of user network activity. For purposes of this disclosure, the term "UEBA system" may be either a cybersecurity UEBA system or a UBA system.

In response to receiving an alert that a user has accessed a network entity (e.g., a host) for the first time, the UEBA system uses a factorization machine to calculate an affinity measure between the accessing user and the accessed entity. The affinity measure is based on the user's historical access patterns in the network, as wells as the user's context data and entity context data.

In certain embodiments, the affinity measure is used to filter first-time access alerts. In such case, the UEBA system compares the calculated user-to-entity affinity measure to an affinity threshold. The threshold is based on an ROC curve constructed from affinity score distributions from legitimate first-time access events and affinity score distributions from randomly sampled, never-observed user-entity pairs.

If the user-to-entity affinity measure does not satisfy the affinity threshold, it means that user's access of the entity was unexpected (i.e., not predicted) and, thus, a potential cyber threat. In such case, the UEBA system uses the first-time access event to increase a cybersecurity risk assessment associated with the user's network activity. For example, the system may add points to a risk score associated with the user's current logon session. If the user-to-entity affinity measure satisfies the affinity threshold, it means that the user's access of the entity was predictable. In such case, the first-time access alert is treated as a false positive (with respect to being malicious activity), and the UEBA system disregards first-time access event in performing a risk assessment of the user's network activity. For example, the system does not add points to a risk score associated with the user's logon session due to the first-time access event.

In certain embodiments, the user-to-entity affinity measure is used to weight risk score points associated with a first-time access event. For example, the risk score points associated with a first-time access event may be weighted by the affinity score in calculating the risk score associated with a period of user network activity.

DETAILED DESCRIPTION OF THE PREFERRED EMBODIMENTS

The present disclosure describes a system, method, and computer program for determining the risk associated with a first-time, user-to-entity access event in a computer network. The method is executed by a UEBA system that detects cyber threats in a network and performs risk assessments of user network activity. An example of performing a risk assessment is assigning a risk score to a period of user network activity, such as a user logon session.

As described in more detail below, in response to receiving a first-time access alert, the UEBA system uses a factorization machine to determine the affinity between a user and an accessed entity, and thus determine the risk associated with the access event. The affinity is represented by a numerical user-to-entity affinity measure score ("the affinity measure"), which is based on the accessing user's historical access patterns in the network, as wells as the accessing user's context data and accessed entity's context data (i.e., the input to the factorization machine is the user's historical access patterns, the user's context data, and the accessed entity's context data). The affinity measure effectively represents the degree to which the access event was expected or predicted. The stronger the affinity between the user and an entity, the less risk associated with the event. The affinity measures for first-time access events may be used to filter first-time access alerts or weight first-time access alerts in performing risk assessments of user network activity (e.g., calculating a risk score for a user logon session). The result is that many false-positive first-time access alerts are suppressed and not factored (or not factored heavily) into the risk assessments.

Figure 1:
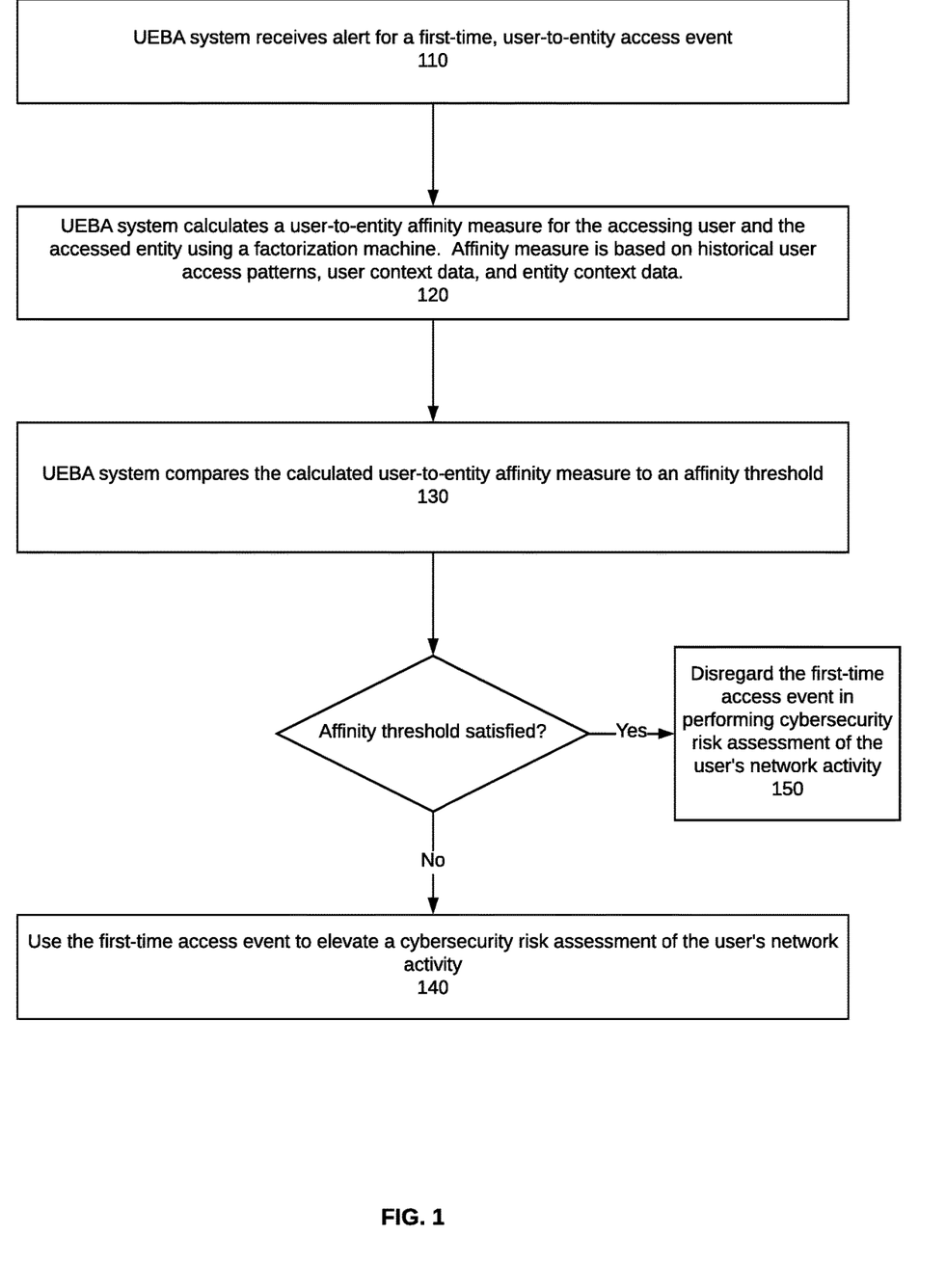
FIG. 1 is a flowchart that illustrates a method, according to one embodiment, for determining the risk associated with a first-time access event in a computer network.

FIG. 1 illustrates a method for determining the risk associated with a first-time access event in a computer network. In response to the UEBA system detecting or receiving an alert for a first-time access event (step 110), the UEBA system calculates a user-to-entity affinity measure for the user/entity pair using a factorization machine (120). The factorization machine is a software module executed by the UEBA system that receives the user's historical entity-access patterns, the user's context data, and accessed entity's context data as input, and then outputs an affinity measure for the user/entity pair. The affinity measure represents the mathematical "distance" between the accessing user and the accessed entity. The factorization machine applies a factorization machine-learning algorithm to the input data and is trained as described with respect to FIG. 2.

User and entity context data are attributes of the user and entity, respectfully. Example of user context data includes the user's peer group, the user's network zone, the user's time zone, and other static user or peer data available in a directory service (e.g., Active Directory) or elsewhere. Example of entity context data includes peer group associated with the entity and labels associated with the entity, such as "critical" or "non-critical."

In one embodiment, the affinity measure values are normalized. For example, the affinity measure may be a numerical value between 0-2, wherein 0 represents an illegitimate access and 2 represents a strong affinity (i.e., frequent access in the past).

After calculating the user-to-entity affinity measure, the UEBA system compares the calculated user-to-entity affinity measure to an affinity threshold (step 130). As described in more detail below with respect to FIG. 3, the threshold may be based on an ROC curve constructed from affinity score distributions from legitimate first-time access events and affinity score distributions from randomly sampled, never-observed user-entity pairs.

If the user-to-entity measure does not satisfy the affinity threshold, it means that user's access of the entity was unexpected (i.e., not predicted) and, thus, a potential cyber threat. In such case, the UEBA system uses the first-access event to elevate a cybersecurity risk assessment of the user's network activity (step 140). For example, the first-time access event may have triggered a rule associated with points for a cybersecurity risk score for the user's current logon session, and such risk points are included in the user's risk score.

If the user-to-entity affinity measure satisfies the affinity threshold, it means that the user's access of the entity was predictable. In such case, the first-time access alert is treated as a false positive (with respect to being malicious activity), and the UEBA system disregards the first-time access event in performing a cybersecurity risk assessment of the user's network activity (i.e., it does not elevate the risk assessment in response to the first-time access event) (step 150). For example, in calculating a cybersecurity risk score for a user's current logon session, any risk points associated with a rule triggered by the first-time access event are not factored into the risk score.

In steps 130-150, the user-to-entity affinity measure is used to filter first-time access event alerts in performing cybersecurity risk assessments. However, in an alternate embodiment, the user-to-entity affinity measure is used to weight risk score points associated with a first-time access event. For example, risk score points associated with a rule triggered by a first-time access event may be weighted based on the corresponding user-to-entity affinity measure.

Figure 2:
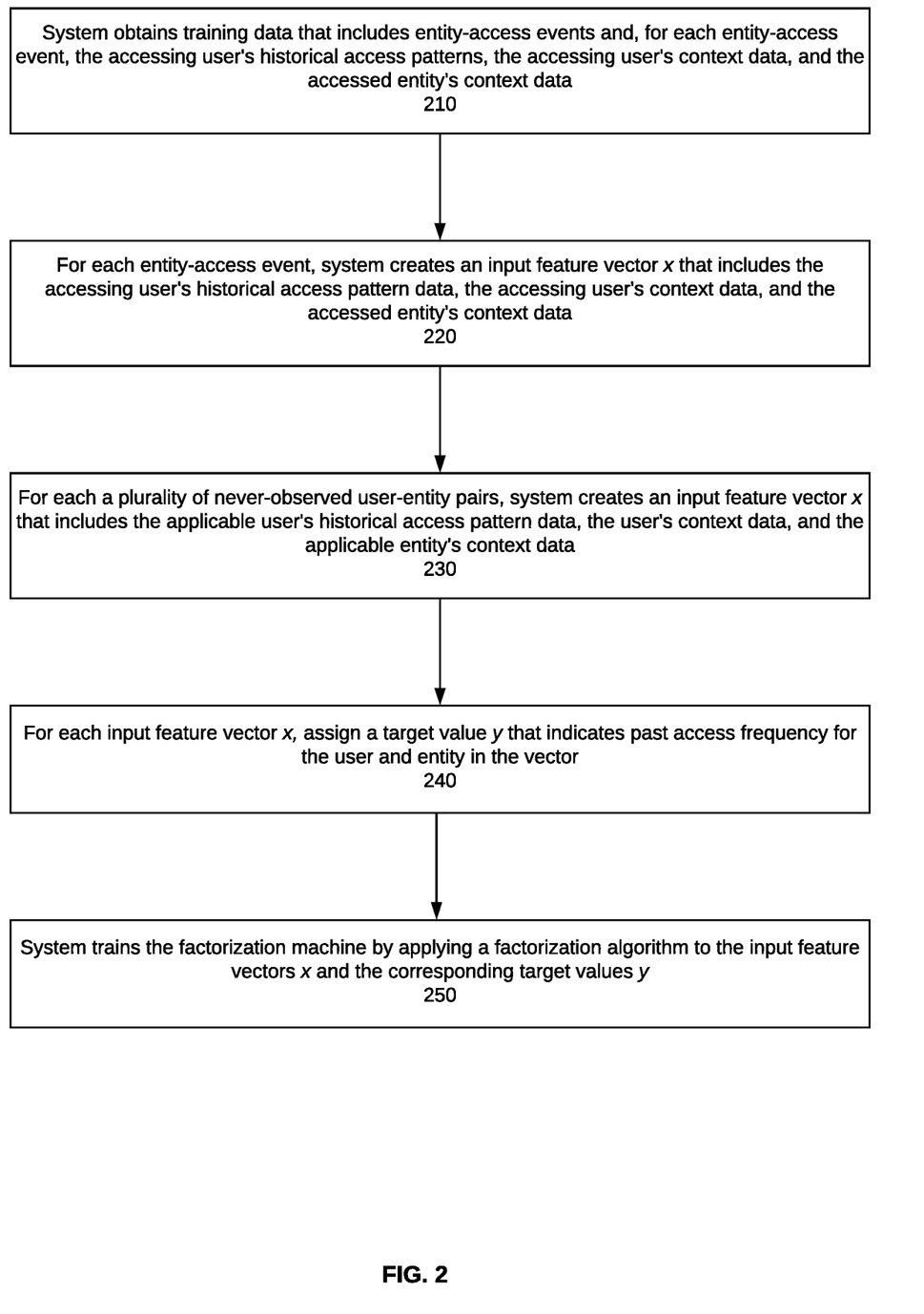
FIG. 2 is a flowchart that illustrates a method, according to one embodiment, for training a factorization machine.

FIG. 2 illustrates a method for training a factorization machine. This method is performed by the UEBA system or a system in communication with the UEBA system. For purposes of the discussion of FIGS. 2 and 3, the term "system" can apply to either. The system obtains training data that includes entity-access events and, for each entity-access event, the accessing user's historical access patterns, accessing user's context data, and accessed entity's context data (step 210). For each of such entity-access events, the system creates an input feature vector x that includes the accessing user's access pattern data, the accessing user's context data, and the accessed entity's context data (step 220).

Every observed access event in the training data is assumed to be a legitimate access event. The challenge is finding illegitimate access events to use for training the factorization machine as these events are not observed in training. This is different than training factorization machines used for retail recommendations in which the values predicted (e.g., 1-5 stars for a movie) are values that are observed in the training data.

To address the issue of lack of observed illegitimate access in the training data, a random sampling of never observed user-entity accesses are treated as illegitimate accesses for training purposes. For example, the entities accessed by two different groups (e.g., engineering and HR) in an organization during a period of time are identified. Any entities accessed by at least one user in one group and never accessed by any user in the other group are also identified. This is done for both groups. Users in the first group (e.g., the engineering group) are randomly paired with entities accessed by the second group (e.g., HR) and never the first group. This is done for both groups. For each such random, never-observed user-entity pairing, the system creates an input feature vector that includes the applicable user's access pattern data, the user's context data, and the applicable entity's context data (step 230).

For each input feature vector x, the system assigns a target value y that indicates frequency of access for the user and entity in the vector, wherein feature vectors for never-observed user-entity accesses are assigned a target value that represents an illegitimate access (step 240). In one embodiment, y is a value between 0-2, where 0 represents no previous access and 2 represents "frequent" accesses in a period of time. For example, in such embodiment, user-entity pairs with two or more access in a period of time (e.g., two or more times within thirty days) are associated with a y value of 2, and user-entity pairs with one access in the period of time are associated with a y value of 1. The never-observed user/entity pairs are associated with a y value of zero.

The system trains the factorization machine by applying factorization machine algorithm to the input feature vectors and corresponding target values (step 250). In one embodiment, such algorithm is represented by the following equation:

$$\tilde{y} = w_0 + \sum_i w_i x_i + \sum_i \sum_{j>i} \langle v_i, v_j \rangle x_i x_j$$

where:
 $x_i$ is the input feature vector;
 y is the target value;
 $w_0$ and $w_i$ are linear regression parameters
 $v_i$ is a k-dimensional latent vector for feature i.
 $\langle v_i, v_j \rangle$ denotes the factorized interaction parameter between $v_i$ and $v_j$ In one embodiment, to optimize hyper-parameters of the factorization machine, such as k in the list above, the training data is randomly split in two parts: 80% for the training dataset and 20% for the validation dataset. The training data set is used to train the factorization machine in accordance with the above-described training method, and the validation dataset is used to find the optimal hyperme­ters, such as k, for the factorization machine.

Figure 3:
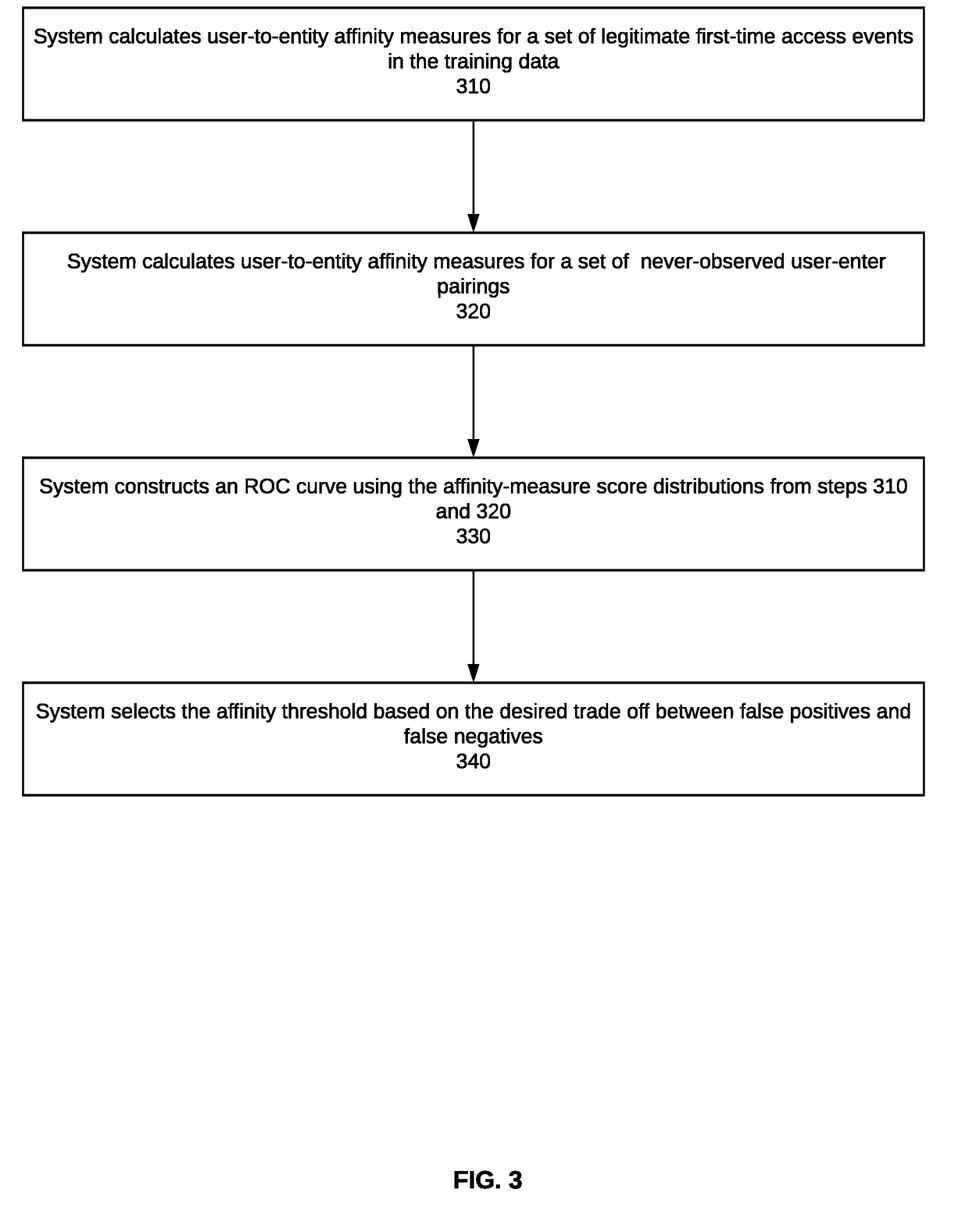
FIG. 3 is a flowchart that illustrates a method, according to one embodiment, for determining the affinity threshold value.

FIG. 3 illustrates a method for determining the affinity threshold value. A computer system calculates user-to-entity affinity measures for both observed first-time access events in the training data (which are assumed to be legitimate) and a random sampling of never-observed user-entity pairings (which are assumed to be malicious) (steps 310, 320). The system then constructs a receiving operating characteristic (ROC) curve using the affinity-measure score distributions from steps 310 and 320 (step 330), and it selects the affinity threshold based on the desired tradeoff between false positives and false negatives (step 340). The tradeoff parameters may be preconfigured or inputted by a system administrator via a user interface to the system. In one embodiment, the ROC curve is constructed from a subset of training data reserved for threshold tuning.

The methods described with respect to FIGS. 1-3 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

Figure 4:
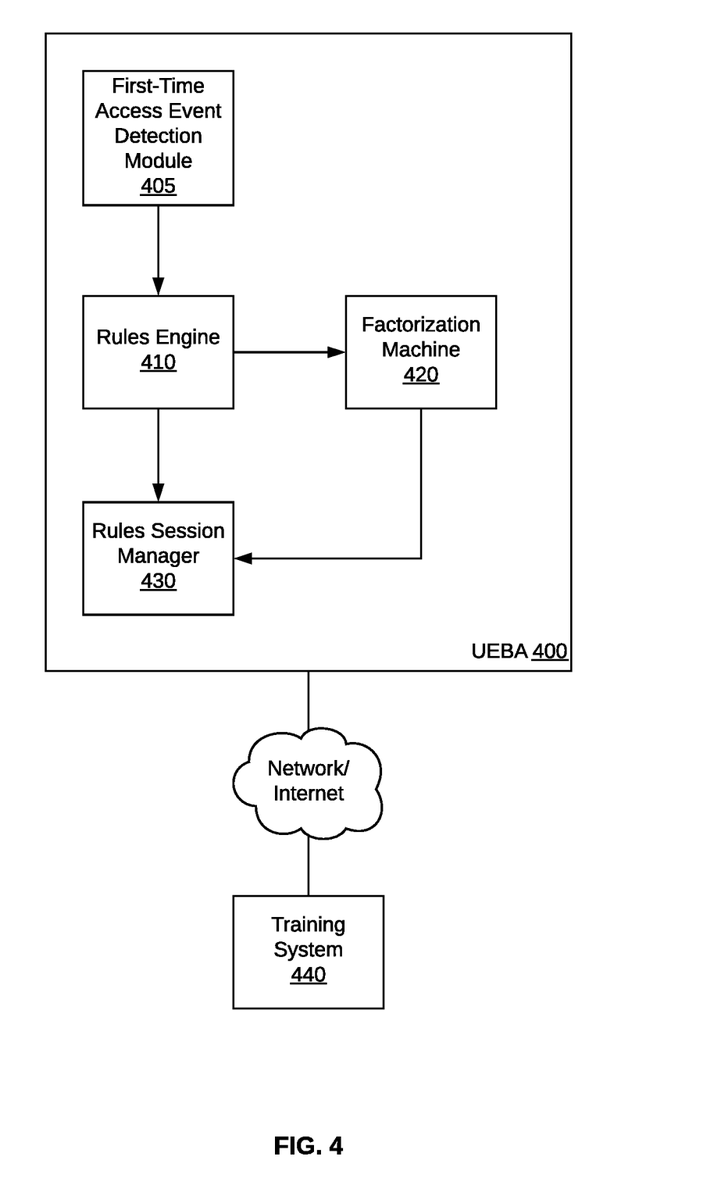
FIG. 4 is a block diagram of an example UEBA system for cybersecurity.

FIG. 4 illustrates an example system for performing the methods described herein. A UEBA system 400 includes a first-time entity access event detection module 405, which generates first-time access alerts in response to detecting a first-time entity access event. This triggers a first-time access rule in a Rules Engine 410 which provides a Rules Session Manager module 430 with risk points associated with the rule. A Factorization Machine module 420 calculates the user-to-entity affinity measure for the user/entity pair associated with the first-time access event. The Rule Session Manager 430 compares the user-to-entity affinity measure to the affinity threshold and either adds the risk points to the user's risk score or discards them, depending on the threshold determination. Alternatively, the Rules Session Manager 430 may use the user-to-entity affinity measure to weight the points associates with the triggered rule.

The UEBA system 400 is in communication with computer system 440, which trains the Factorization Machine 420 and calculates the affinity threshold.

Those skilled in the art will appreciate that a UEBA system has other modules not shown in FIG. 4, as they are not relevant to the present disclosure. An example of a UEBA system and how to calculate a risk score is described in U.S. Pat. No. 9,798,883, which is incorporated by reference above.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method for determining risk associated with a first-time access event in a computer network, wherein the method is performed by a computer system that performs a cybersecurity risk assessment of a user's IT activity in the computer network, the method comprising:
    receiving an alert at the computer system for a first-time access event in the computer network, wherein the first-time access event involves a user accessing a network entity for a first time;
    in response to receiving the alert for a first-time access event and without regard for any subsequent access events, calculating a user-to-entity affinity measure for the user using a factorization machine, wherein the user-to-entity affinity measure represents the degree to which it was expected for the user to access the network entity for the first time and wherein the user-to-entity affinity measure is based on the user's historical entity-access patterns, context data for the user, and context data for the entity;
    comparing the calculated user-to-entity affinity measure to an affinity threshold, wherein the affinity threshold is based on a receiving operating characteristic curve constructed from affinity score distributions from legitimate first-time access events and from affinity score distributions from a sampling of user/entity pairs with no observed accesses;
    in response to the user-to-entity affinity measure not satisfying the affinity threshold, using the first-time access event to elevate a risk assessment associated with the user's network activity; and in response to the user-to-entity affinity measure satisfying the affinity threshold, disregarding the first-time access event in performing a risk assessment of the user's network activity.

2. The method of claim 1, wherein the risk assessment is represented by a risk score, wherein increasing the risk assessment comprises adding risk points to the risk score, and wherein the method further comprises outputting a risk score by the computer system.

3. The method of claim 1, wherein user context data is one or more of the following user attributes: user peer group, user network zone, and user time zone.

4. The method of claim 3, wherein entity context data is one or more of the following entity attributes: peer group associated with entity, and label associated with entity.

5. The method of claim 1, wherein the factorization machine is trained using training data with entity access events and corresponding user access patterns, user context data, and entity context data, and wherein the training comprises:
- for each of a plurality of entity access events in the training data, creating an input feature vector that includes corresponding user access pattern data, user context data, and entity context data;
- identifying a plurality of user-entity pairs with no observed accesses;
- for each of the user-entity pairs with no observed accesses, creating an input feature vector that includes the corresponding user access pattern data, user context data, and entity context data;
- for each input feature vector, assigning a target value to the input vector based on the number of accesses in a period of time observed for the user-entity pair associated with the input feature vector; and
- applying a factorization machine algorithm to the feature input vectors and corresponding target values.

6. A non-transitory computer-readable medium comprising a computer program, that, when executed by a computer system that performs a risk assessment of a user's IT activity in a computer network, enables the computer system to perform the following method for determining the risk associated with a first-time access event in a computer network, the method comprising:
- receiving an alert at the computer system for a first-time access event in the computer network, wherein the first-time access event involves a user accessing a network entity for a first time;
- in response to receiving the alert for a first-time access event and without regard for any subsequent access events, calculating a user-to-entity affinity measure for the user using a factorization machine, wherein the user-to-entity affinity measure represents the degree to which it was expected for the user to access the network entity for the first time and wherein the user-to-entity affinity measure is based on the user's historical entity-access patterns, context data for the user, and context data for the entity;
- comparing the calculated user-to-entity affinity measure to an affinity threshold, wherein the affinity threshold is based on a receiving operating characteristic curve constructed from affinity score distributions from legitimate first-time access events and from affinity score distributions from a sampling of user/entity pairs with no observed accesses;
- in response to the user-to-entity affinity measure not satisfying the affinity threshold, using the first-time access event to elevate a risk assessment associated with the user's network activity; and
- in response to the user-to-entity affinity measure satisfying the affinity threshold, disregarding the first-time access event in performing a risk assessment of the user's network activity.

7. The non-transitory computer-readable medium of claim 6, wherein the risk assessment is represented by a risk score, wherein increasing the risk assessment comprises adding risk points to the risk score, and wherein the method further comprises outputting a risk score by the computer system.

8. The non-transitory computer-readable medium of claim 6, wherein user context data is one or more of the following user attributes: user peer group, user network zone, and user time zone.

9. The non-transitory computer-readable medium of claim 8, wherein entity context data is one or more of the following entity attributes: peer group associated with entity, and label associated with entity.

10. The non-transitory computer-readable medium of claim 6, wherein the factorization machine is trained using training data with entity access events and corresponding user access patterns, user context data, and entity context data, and wherein the training comprises:
- for each of a plurality of entity access events in the training data, creating an input feature vector that includes corresponding user access pattern data, user context data, and entity context data;
- identifying a plurality of user-entity pairs with no observed accesses;
- for each of the user-entity pairs with no observed accesses, creating an input feature vector that includes the corresponding user access pattern data, user context data, and entity context data;
- for each input feature vector, assigning a target value to the input vector based on the number of accesses in a period of time observed for the user-entity pair associated with the input feature vector; and
- applying a factorization machine algorithm to the feature input vectors and corresponding target values.

11. A computer system for determining risk associated with a first-time access event in a computer network, the system comprising:
- one or more processors;
- one or more memory units coupled to the one or more processors, wherein the one or more memory units store instructions that, when executed by the one or more processors, cause the system to perform the operations of:
  - receiving an alert at the computer system for a first-time access event in the computer network, wherein the first-time access event involves a user accessing a network entity for a first time;
  - in response to receiving the alert for a first-time access event and without regard for any subsequent access events, calculating a user-to-entity affinity measure for the user using a factorization machine, wherein the user-to-entity affinity measure represents the degree to which it was expected for the user to access the network entity for the first time and wherein the user-to-entity affinity measure is based on the user's historical entity-access patterns, context data for the user, and context data for the entity;
  - comparing the calculated user-to-entity affinity measure to an affinity threshold, wherein the affinity threshold is based on a receiving operating characteristic curve constructed from affinity score distributions from legitimate first-time access events and from affinity score distributions from a sampling of user/entity pairs with no observed accesses;
in response to the user-to-entity affinity measure not satisfying the affinity threshold, using the first-time access event to elevate a risk assessment associated with the user's network activity; and
in response to the user-to-entity affinity measure satisfying the affinity threshold, disregarding the first-time access event in performing a risk assessment of the user's network activity.

12. The system of claim 11, wherein the risk assessment is represented by a risk score, wherein increasing the risk assessment comprises adding risk points to the risk score, and wherein the method further comprises outputting a risk score by the system.

13. The system of claim 11, wherein user context data is one or more of the following user attributes: user peer group, user network zone, and user time zone.

14. The system of claim 13, wherein entity context data is one or more of the following entity attributes: peer group associated with entity, and label associated with entity.

15. The system of claim 11, wherein the factorization machine is trained using training data with entity access events and corresponding user access patterns, user context data, and entity context data, and wherein the training comprises:
for each of a plurality of entity access events in the training data, creating an input feature vector that includes corresponding user access pattern data, user context data, and entity context data;
identifying a plurality of user-entity pairs with no observed accesses;
for each of the user-entity pairs with no observed accesses, creating an input feature vector that includes the corresponding user access pattern data, user context data, and entity context data;
for each input feature vector, assigning a target value to the input vector based on the number of accesses in a period of time observed for the user-entity pair associated with the input feature vector; and
applying a factorization machine algorithm to the feature input vectors and corresponding target values.

16. A non-transitory computer-readable medium comprising a computer program, that, when executed by a computer system that calculates a risk score associate with a user's IT activity in a computer network, enables the computer system to perform the following method for determining the risk associated with a first-time access event in a computer network, the method comprising:
receiving an alert at the computer system for a first-time access event in the computer network, wherein the first-time access event involves a user accessing a network entity for a first time;
in response to receiving the alert for a first-time access event and without regard for any subsequent access events, calculating a user-to-entity affinity measure for the user using a factorization machine, wherein the user-to-entity affinity measure represents the degree to which it was expected for the user to access the network entity for the first time and wherein the user-to-entity affinity measure is based on the user's historical entity-access patterns, context data for the user, and context data for the entity; and
weighting risk points associated with the first-time access event based on the user-to-entity affinity measure, wherein the risk points are used in calculating a cybersecurity risk score for the user's current network session.

17. The non-transitory computer-readable medium of claim 16,
further comprising outputting the cybersecurity risk score.

18. The non-transitory computer-readable medium of claim 16, wherein user context data is one or more of the following user attributes: user peer group, user network zone, and user time zone.

19. The non-transitory computer-readable medium of claim 18, wherein entity context data is one or more of the following entity attributes: peer group associated with entity, and label associated with entity.

20. The non-transitory computer-readable medium of claim 16, wherein the factorization machine is trained using training data with entity access events and corresponding user access patterns, user context data, and entity context data, and wherein the training comprises:
for each of a plurality of entity access events in the training data, creating an input feature vector that includes corresponding user access pattern data, user context data, and entity context data;
identifying a plurality of user-entity pairs with no observed accesses;
for each of the user-entity pairs with no observed accesses, creating an input feature vector that includes the corresponding user access pattern data, user context data, and entity context data;
for each input feature vector, assigning a target value to the input vector based on the number of accesses in a period of time observed for the user-entity pair associated with the input feature vector; and
applying a factorization machine algorithm to the feature input vectors and corresponding target values.

* * * * *